United States Patent
Turner

(10) Patent No.: US 8,253,410 B2
(45) Date of Patent: Aug. 28, 2012

(54) PROTECTIVE SYSTEM FOR A MULTIPLE CHANNEL TRANSFORMER PROBE

(75) Inventor: Nigel Philip Turner, Hampshire (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 290 days.

(21) Appl. No.: 12/659,052

(22) Filed: Feb. 24, 2010

(65) Prior Publication Data

US 2010/0237855 A1    Sep. 23, 2010

(30) Foreign Application Priority Data

Mar. 18, 2009    (GB) .................................. 0904652.5

(51) Int. Cl.
*G01B 7/14*    (2006.01)
(52) U.S. Cl. ............... 324/207.15; 324/173; 324/207.16
(58) Field of Classification Search .................. 324/173, 324/207.15, 207.16
See application file for complete search history.

(56) References Cited

U.S. PATENT DOCUMENTS
7,148,679 B2    12/2006    Proctor

FOREIGN PATENT DOCUMENTS

| EP | 0 169 670 | 1/1986 |
|----|-----------|--------|
| EP | 2 015 081 | 1/2009 |
| GB | 2 387 656 | 10/2003 |

OTHER PUBLICATIONS

UK Search Report dated Jun. 9, 2009 for GB 0904652.2.

*Primary Examiner* — Reena Aurora
(74) *Attorney, Agent, or Firm* — Nixon & Vanderhye, P.C.

(57) ABSTRACT

The invention provides a transformer probe for sensing movement of a body of magnetic material, having multiple output channels wherein the output in each output channel is substantially unaffected by faults in other output channels. The transformer probe comprises a magnetically energizable pole piece, a sensing circuit comprising an electrical circuit having a portion, remote from the pole piece, which forms first and second transformer primary coils, a first output circuit comprising a first transformer secondary coil, inductively coupled to the first primary coil via a first transformer core, and terminated by a first load resistance, and means for measuring an output signal from the secondary circuit, a second output circuit comprising a second transformer secondary coil, inductively coupled to the second primary coil via a second transformer core and terminated by a second load resistance and means for measuring an output signal from the second secondary coil, and an inductive coupling, or resistive electrical component, connected across each primary coil, having an impedance within the sensing circuit such that a change from a normal circuit condition to an open circuit condition within the first or second output circuit does not significantly affect the voltage across the first and second primary coils.

7 Claims, 3 Drawing Sheets

PROTECTIVE SYSTEM FOR A MULTIPLE CHANNEL TRANSFORMER PROBE

This application claims priority to GB 0904652.5 filed 18 Mar. 2009, the entire contents of which is hereby incorporated by reference.

FIELD OF THE INVENTION

This invention relates to a system for preventing a fault in one output channel of a multiple channel transformer probe from adversely affecting the outputs from other channels of the multiple channel transformer probe.

BACKGROUND TO THE INVENTION

The use of magnetic sensors in cooperation with, for example, one or more projections on a shaft to give an output from which shaft rotational speed or torque may be determined is well known. In such sensors, a voltage induced in a coil by changes in a magnetic flux pattern of a magnetically energised pole piece, caused by a movement of a body of magnetic material in the field of the pole piece is detected and measured.

The rotational speed of a rotating element can be determined by measuring the frequency of the periodic signal produced in the coil as one or more markers or elements on the surface of the rotating element pass through the field of the pole piece.

EP-A-169670 and U.S. Pat. No. 4,739,260 describe transformer probes for detecting movement of magnetic objects in which one end of a closed loop electrical circuit formed from an electrical conductor is wound around a pole piece such that movement of a magnetic body through a first flux pattern generated by the pole piece induces a current in the conductor, which generates a second flux pattern at the second end of the closed loop, remote from the first end, which forms a primary coil of transformer. The primary coil is inductively coupled to a multi-turn secondary coil terminated at an output connected to a detecting apparatus. When the resistance of the closed loop electrical circuit is low, a magnetic object passing in the vicinity of the pole piece induces a low voltage, high current signal in the primary coil, which is transformed into a high output voltage at the output of the secondary coil.

GB 2387656 discloses a transformer probe in which a shorting turn of a conductor is inductively coupled to the primary and secondary coils of a transformer probe to limit the output voltage at high speeds. The shorting turn acts to limit the output voltage at the output of the secondary coil at high frequencies, i.e. when the rotational speed of the magnetic object being detected is high.

Multiple channel transformer probes provide multiple output signals from a single speed sensor. One application of this type of probe is as a speed sensor in aircraft engine control systems. Speed sensors in aircraft control systems are provided with multiple output channels for reasons of redundancy and system safety. The multiple channels can be provided by coupling the primary circuit to multiple secondary coils, each wound around a separate transformer core. However, as the multiple outputs generated by the multiple secondary coils are to provide redundancy, it is very important that a fault in one output channel does not adversely affect the output in another output channel. This can occur when multiple output channels are coupled to the same primary circuit.

This problem is particularly acute at low speeds, because at low speeds the output voltage from each channel is relatively low. It is an aim of the present invention to provide a system to ensure sufficient output voltage at low speeds, even when one or more output channels have an open circuit fault.

SUMMARY OF THE INVENTION

The present invention is defined in the appended claims.

According to one aspect of the invention, there is provided a transformer probe for sensing movement of a body of magnetic material comprising:

a magnetically energisable pole piece;

a sensing circuit comprising an electrical circuit having a first portion which is inductively coupled to the pole piece, the arrangement being such that movement of a body of magnetic material relative to the pole piece induces a current in the sensing circuit, and a second portion, remote from the pole piece, which forms first and second transformer primary coils;

a first output circuit comprising a first transformer secondary coil, inductively coupled to the first primary coil via a first transformer core, and terminated by a first load resistance, and means for measuring an output signal from the secondary circuit, wherein the first primary coil and first secondary coil form a first transformer such that a current in the first primary coil induces a voltage across the first secondary coil;

a second output circuit comprising a second transformer secondary coil, inductively coupled to the second primary coil via a second transformer core and terminated by a second load resistance and means for measuring an output signal from the second secondary coil, wherein the second primary coil and second secondary coil form a second transformer such that a current in the second primary coil induces a voltage across the second secondary coil; and an inductive coupling, or resistive electrical component connected across each primary coil, having an impedance within the sensing circuit such that a change from a normal circuit condition to an open circuit condition within the first or second output circuit does not significantly affect the voltage across the first and second primary coils.

The present invention overcomes the difficulties encountered in the prior art transformer probes by providing a transformer probe having multiple output channels wherein the output in each output channel is substantially unaffected by faults in other output channels.

DETAILED DESCRIPTION OF THE DRAWINGS

Preferred embodiments in the invention will now be described, by way of example, with reference to the accompanying drawings, in which:

FIG. 1b shows the equivalent circuit for the system in FIG. 1a;

FIG. 2b shows the equivalent circuit for the system in FIG. 2a;

FIG. 3b shows an equivalent circuit for the system shown in FIG. 3a.

DETAILED DESCRIPTION

Figure 1A:
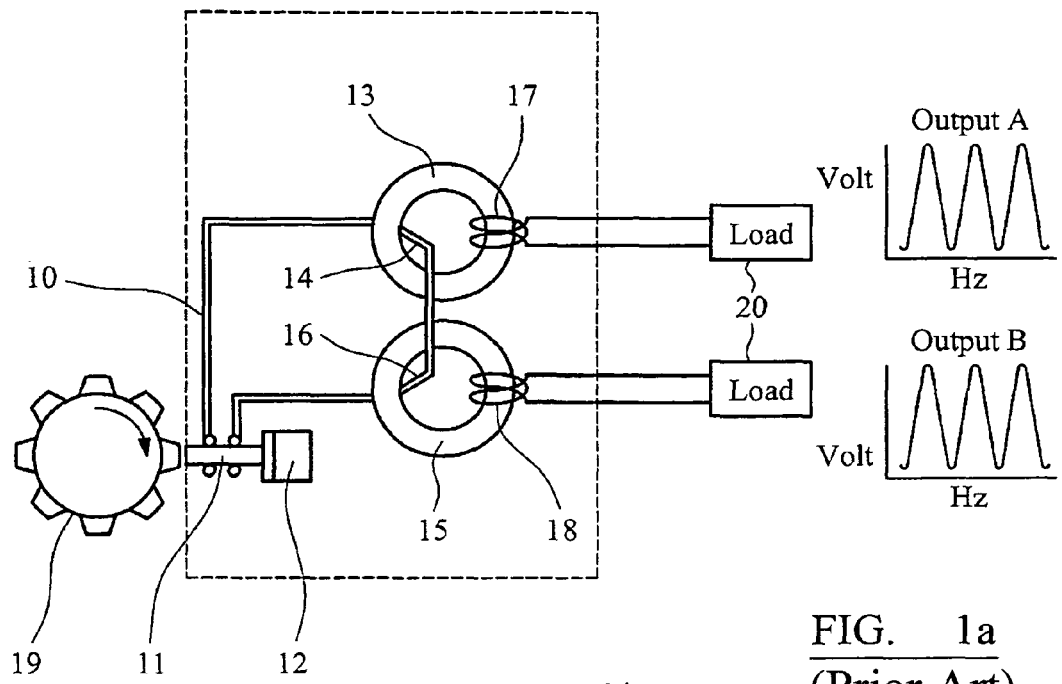
FIG. 1a shows a multiple channel transformer probe in accordance with the prior art.

FIG. 1a is a schematic illustration of a two channel transformer probe for measuring rotational speed in accordance with the prior art.

The transformer probe of FIG. 1 comprises a primary circuit 10 consisting of a closed loop of electrically conductive material. The primary circuit may be formed from copper wire, preferably with a diameter of 1 to 2 millimetres, or from any other conductor with low DC resistance such as, for example, steel or bronze.

A first end of the primary circuit 10 is wound around a pole piece 11 of a permanent magnet 12, forming a pole piece coil. The other end of the primary circuit 10, distant from the first end and the pole piece, is wound around a first magnetic transformer core 13 to form a first primary coil 14 of a first transformer. The primary circuit is also wound around a second magnetic transformer core 15 to form a second primary coil 16 of a second transformer.

The primary circuit preferably has a low DC resistance so as to have a low load in comparison to that of the primary coils. The inductance of the primary coils is likely to be of the order of 1 to 2 µH and the resistance of the conducting primary circuit is typically 1 to 20 mΩ.

Secondary coils 17, 18 are wound around each of the magnetic transformer cores, to form secondary coils of the transformers. Each secondary coil is connected by a pair of wires to a load resistance 20 and a measuring apparatus, which for simplicity has been omitted from the figures. In a preferred embodiment of the invention, the load resistances are typically between 1 and 20 KΩ.

The transformer probe of FIG. 1 thus has two output channels resulting from the two secondary coils 17, 18. The EMF generated in both channels originates from the shared pole piece winding. The sensor in FIG. 1 is shown operating under normal conditions, with both output channels giving rise to an oscillating output signal, illustrated as output A and output B.

The mode of operation of the transformer probe shown in FIG. 1a when employed as a speed sensor will now be described.

In FIG. 1a, the transformer probe is shown in a first position relative to a toothed wheel 19 of magnetic material, the rotational speed of which is to be measured. The magnetic flux in the pole piece 11 of the probe depends upon the strength of the magnet 12 and upon the magnetic circuit reluctance of the circuit consisting of the magnet, the pole piece coil, the air gap, the wheel and the air path returning the magnetic field from the wheel to the magnet.

In the position shown in FIG. 1a, the pole piece 11 is opposite one of the teeth of the wheel. There is a small air gap between the pole piece and the tooth and so the magnetic flux in the pole piece is high, as the reluctance of the magnetic circuit is relatively low. When the wheel rotates, the position of the pole piece relative to the wheel teeth changes from the first position shown in FIG. 1a to a second position, in which the pole piece is opposite a gap between two of the teeth of the wheel. In this second position, the air gap between the pole piece and the teeth is larger and the magnetic flux in the pole piece is relatively lower, as the reluctance of the magnetic circuit has increased.

As the wheel 19 rotates and the position of the pole piece 11 relative to the teeth on the wheel changes between the first and second positions, the magnetic flux in the pole piece oscillates between high and low values respectively. The changes in the magnetic flux experienced by the pole piece caused by the variation in the reluctance of magnetic circuit as the wheel rotates induces a current in the primary circuit. As mentioned above, the resistance of the primary circuit 10 is low, such that a high current flows in the circuit. The magnetic flux generated by the current in the primary coils 14, 16 of the transformer induces a voltage in the output secondary coils 17, 18 which are wound around the magnetic cores. In a preferred embodiment of the invention, the secondary coils 17, 18 have many turns compared with the primary coils 14, 16, typically between 200 and 1000 turns, and even as many as 5000 turns, so that a high current in the primary coil induces a high voltage output in the secondary coils. The outputs, output A and output B are illustrated in FIG. 1a.

Figure 1B:
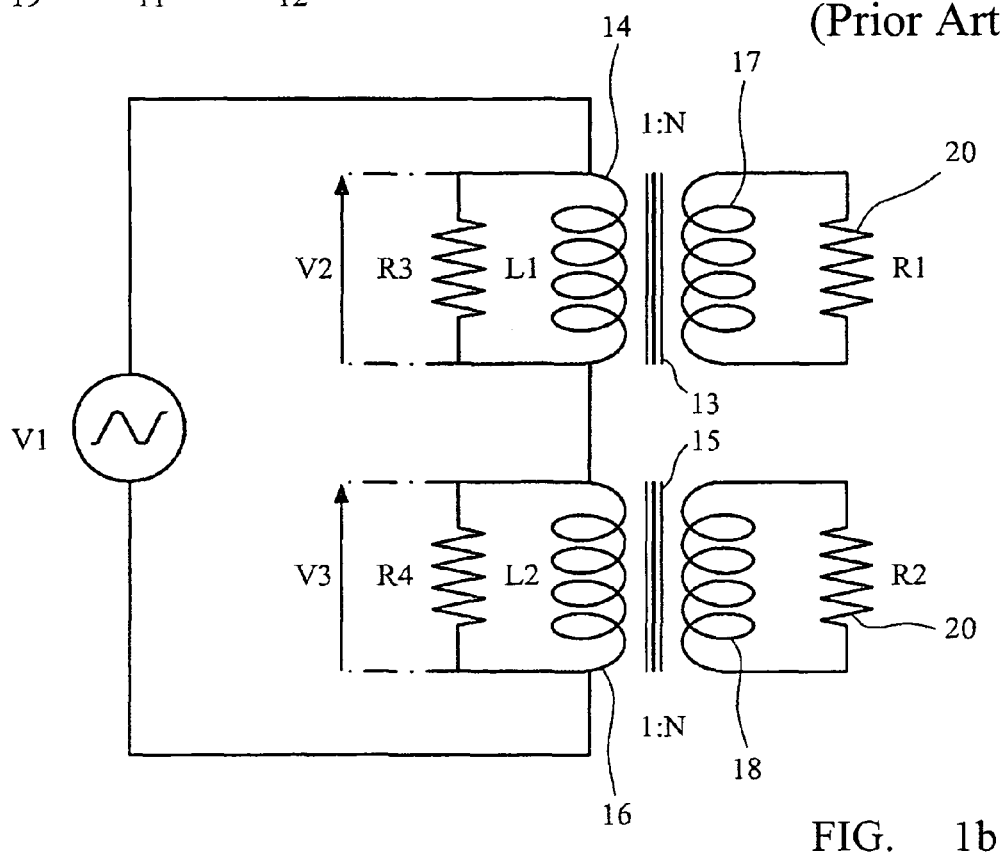

FIG. 1b illustrates the equivalent circuit of the transformer probe shown in FIG. 1a. The two primary coils 14, 16 wound around the transformer cores each have the same number of turns. Likewise the two secondary coils have the same number of turns so that the first and second transformers have the same turns ratio 1:N. In this embodiment, for ease of illustration, the load resistances $R_1$ and $R_2$ are also equal and of the order of 20 KΩ. In reality the load resistances need not be equal. The resistances $R_3$ and $R_4$ are the transformed resistances of each of the secondary circuits. Transformed resistance is a well known property of transformers. $R_3=R_1/N^2$ and $R_4=R_2/N^2$.

Under ordinary operating conditions (i.e. within the expected rotational speed range) the impedance of the primary coils, $\omega L$ is much greater than the transformed resistances $R_3$ and $R_4$. $L_1$ and $L_2$ are selected to be relatively high in order to ensure that a large proportion of the voltage $V_1$ is dropped across them. Both channels give acceptable output signals when there are no faults present.

Figure 2A:
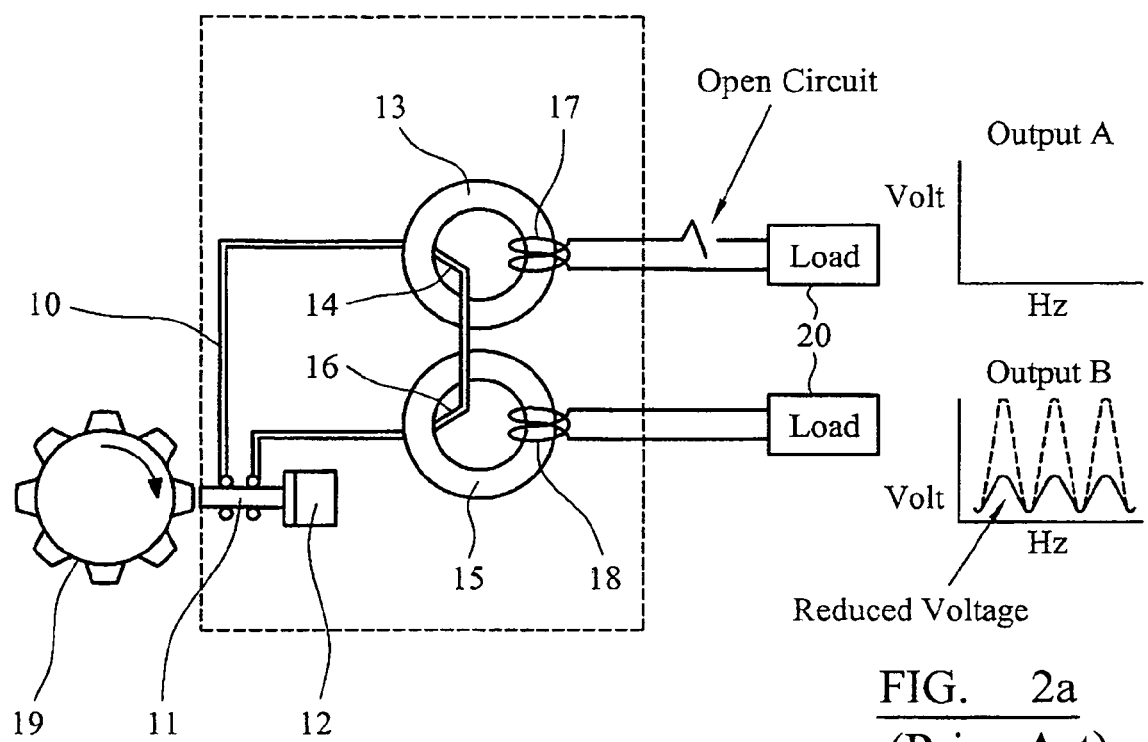
FIG. 2a shows the multiple channel transformer probe of FIG. 1a with an open circuit fault on one of the output channels.

FIG. 2a illustrates the probe of FIG. 1a in which the first of the output channels has an open circuit fault. Clearly, this means that there is no output from the first output channel. But, in addition, the open circuit on the first channel has an adverse effect on the second output channel, reducing the signal amplitude from the second output channel. This occurs because the voltage drop across the primary coil of the first transformer is much larger than the voltage drop across the transformed resistance of the second transformer. As a result, a fault condition on one channel results in neither channel producing an acceptable signal. Output B in FIG. 2a is illustrated with reduced amplitude as a result of the open circuit in the first output channel.

Figure 2B:
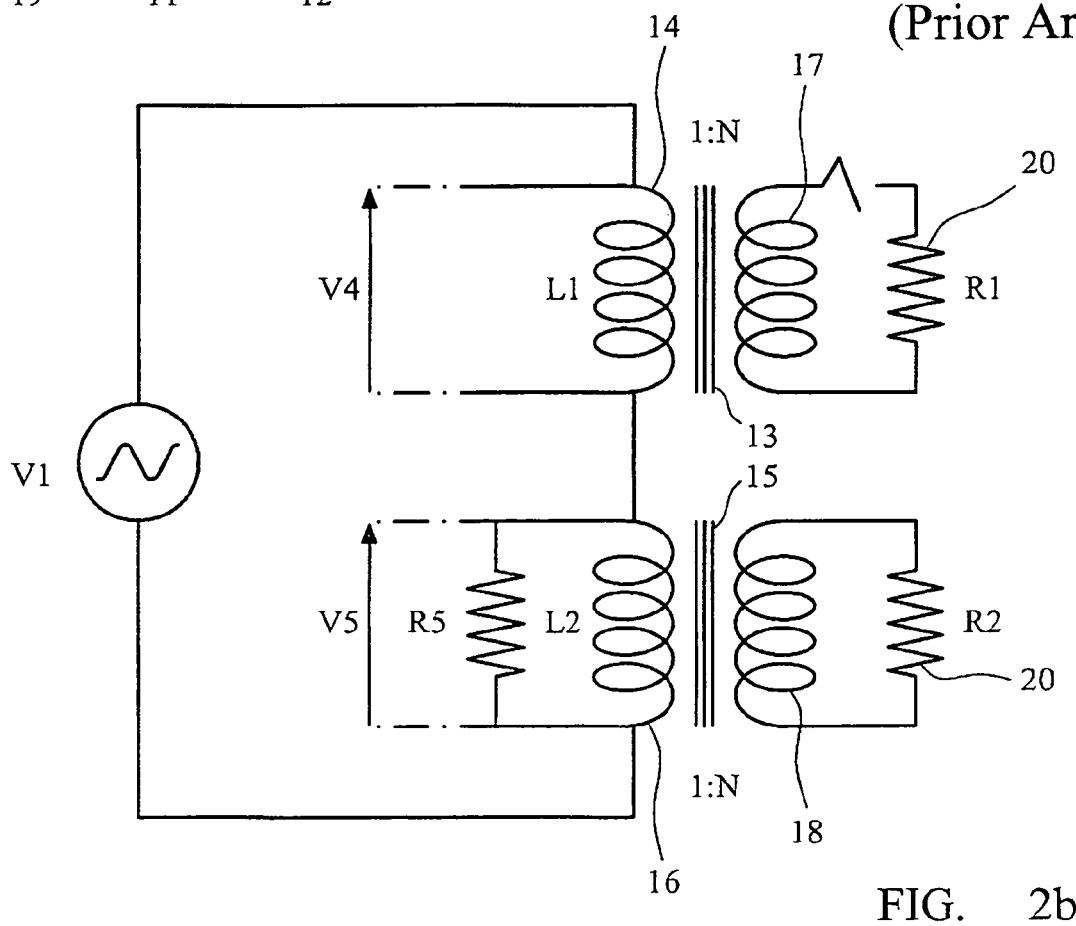

This problem can be understood mathematically, with reference to FIG. 2b, which shows the equivalent circuit of the transformer probe of FIG. 2a.

With reference to FIG. 2b, the transformed resistance of the second output circuit is $R_5$. The first output circuit has no transformed resistance as it is an open circuit. Under normal operating conditions, $R_5 \ll \omega L_2$. The voltage across the second transformer can then be approximated as:

$$V_5 = V_1 \times \frac{R_5}{\sqrt{R_5^2 + \omega^2 L_1^2}}$$

And the voltage across the first transformer can be approximated as:

$$V_4 = V_1 \times \frac{\omega L_1}{\sqrt{R_5^2 + \omega^2 L_1^2}}$$

Since $R_5 \ll \omega L_1$ $$V_5 = V_1 \frac{R_5}{\omega L_1} \approx 0$$

$$V_4 = V_1 \frac{\omega L_1}{\omega L_1} \approx V_1$$

This is why the output voltage $V_5$ drops to a very low value.

In accordance with one aspect of the present invention, in order to solve this problem, additional, low impedance circuits, such as shorting coils are coupled to each of the primary coils. A shorting coil is one or more turns of a conductor wound onto the transformer core with its ends connected to each other. This arrangement is shown in FIG. 3a and the equivalent circuit illustrated in FIG. 3b.

Figure 3A:
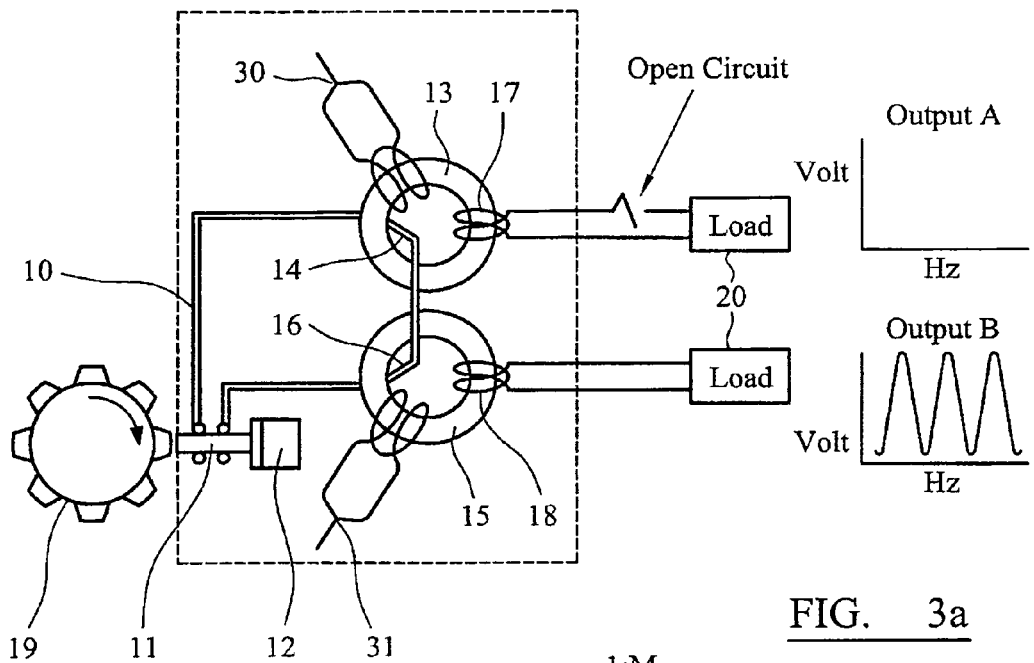
FIG. 3a shows a multiple channel transformer probe in accordance with the present invention.

FIG. 3a shows an arrangement identical to that shown in FIG. 1a but with the addition of shorting turns 30, 31 wound around each transformer core 13, 15. The shorting turns each have a resistance $R_s$, which gives rise to transformed resistances in the primary circuit of $R_6$ and $R_7$.

With the arrangement of FIG. 3a, if an open circuit fault occurs on one of the output channels it has almost no effect on the output of the other channel. This is because the value of the transformed resistance, which is what determines the voltage across the corresponding primary coil, is dominated by the low impedance circuit. By coupling a low impedance circuit to every transformer core, the energy drawn by each transformer core can be held substantially constant even if open circuit faults occur in the output channels.

$R_6$ and $R_7$ are determined by the impedance of the shorted turns 30, 31 and the turns ration M. $R_6 = R_s/M^2$ and $R_7 = R_s/M^2$ For example, if $R_s = 0.1$ mΩ and M = 1÷10 then, under normal operating conditions:

$$R_6 \ll \omega L_1$$

$$R_7 \ll \omega L_2$$

In this embodiment, $R_6 \approx R_7$ therefore $V_6 \approx V_7$ and the output on channel B will remain of substantially the same amplitude even if an open circuit fault occurs on channel A.

By coupling to a circuit with significantly lower impedance than the impedance of the corresponding primary coil, open circuit faults on one output channel will not significantly affect other output channels.

The low impedance circuits 30, 31 may be formed from a few turns of a conductor, such as copper wire, typically with a diameter of the order of 1.0 mm. However, any low resistivity conductor may be used, such as aluminium or bronze. The conductor may be of any cross sectional shape, such as round, rectangular as in a washer, square or ribbon. The use of a few turns of a conductor as a low impedance circuit is inexpensive and reliable.

The resistance of the low impedance circuits 30, 31 is typically in the range of 0.1-2 mΩ. It is important that the transformed resistance of a low impedance circuit in the primary circuit is not made too low otherwise the signal amplitude in the output channels will be too low. This is because the primary circuit 10 has its own impedance in series with the source and it needs to be ensured that a sufficient proportion of the induced voltage is dropped across each primary coil.

The design parameters of the low impedance circuits can be established by electrical modeling of the circuit of a particular transformer probe and through tests performed after the operational characteristics of a particular transformer is found to be acceptable. In a preferred embodiment of the invention the low impedance circuits each comprise between one and five turns of copper wire, which can be easily applied after the transformer has been built. This embodiment of the invention allows the channel outputs to be relatively easily tuned by selection of the number of turns and their resistance.

Instead of using a low impedance circuit wound around each transformer core, a single winding could be used that is coupled to every core. However this is not as reliable as using a dedicated low impedance circuit for each transformer core.

A further alternative is to use real resistance within the primary circuit rather than using the transformed resistance of an inductively coupled low impedance circuit. So instead of $R_6$ and $R_7$ representing transformed resistance $R_s$ in FIG. 3b, they could instead represent electrical components, such as resistors or simply pieces of wire, connected in parallel to the primary coils. In this embodiment, the low impedance circuits $R_s$ are not required.

Figure 3B:
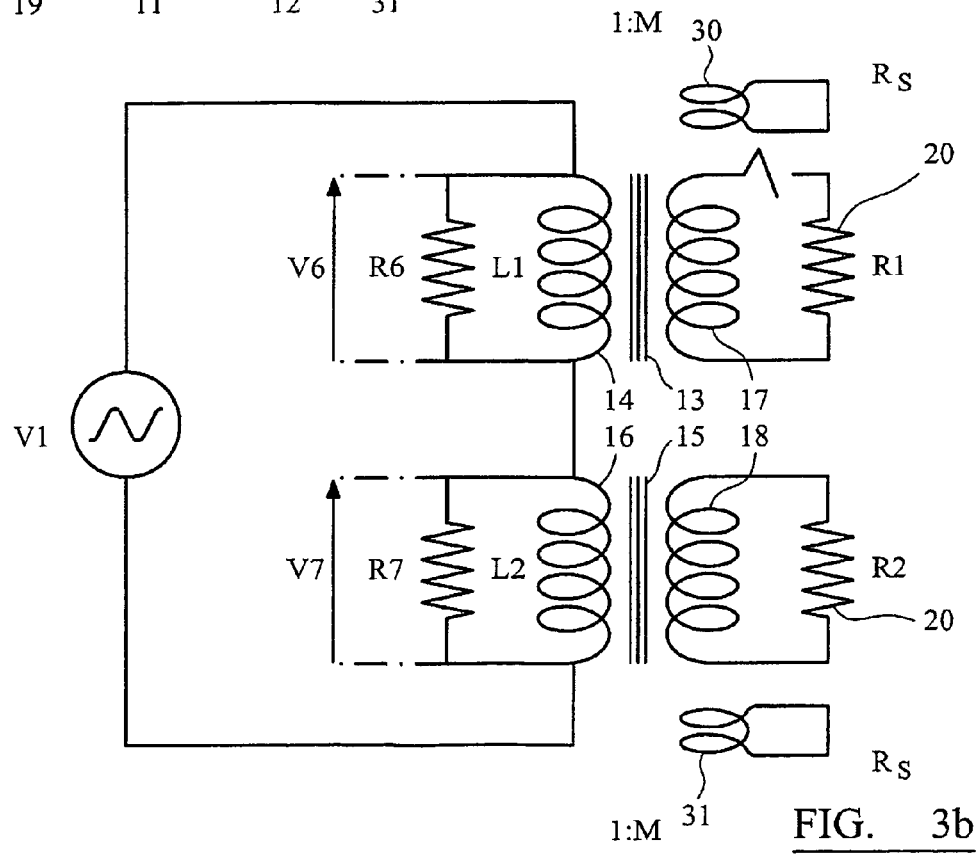

Although the example described with reference to FIGS. 3a and 3b comprises two output channels, the invention is equally applicable to transformer probes having more than two output channels and more than two transformer cores.

The invention claimed is:

1. A transformer probe for sensing movement of a body of magnetic material comprising:
    a magnetically energisable pole piece;
    a sensing circuit comprising an electrical circuit having a first portion which is inductively coupled to the pole piece, the arrangement being such that movement of a body of magnetic material relative to the pole piece induces a current in the sensing circuit, and a second portion, remote from the pole piece, which forms first and second transformer primary coils;
    a first output circuit comprising a first transformer secondary coil, inductively coupled to the first primary coil via a first transformer core, and terminated by a first load resistance, and means for measuring an output signal from the secondary coil, wherein the first primary coil and first secondary coil form a first transformer such that a current in the first primary coil induces a voltage across the first secondary coil;
    a second output circuit comprising a second transformer secondary coil, inductively coupled to the second primary coil via a second transformer core and terminated by a second load resistance and means for measuring an output signal from the second secondary coil, wherein the second primary coil and second secondary coil form a second transformer such that a current in the second primary coil induces a voltage across the second secondary coil; and
    an inductive coupling, or resistive electrical component connected across each primary coil, having an impedance within the sensing circuit such that a change from a normal circuit condition to an open circuit condition within the first or second output circuit does not significantly affect the voltage across the first and second primary coils.

2. A transformer probe according to claim 1, wherein each inductive coupling comprises a low impedance circuit inductively coupled to a primary coil, wherein the low impedance circuit gives rise to a transformed impedance connected in parallel across the primary coil of significantly lower impedance than the primary coil impedance.

3. A transformer probe according to claim 2, wherein a separate low impedance circuit is wound around each transformer core.

4. A transformer probe according to claim 2, wherein the low impedance circuit or circuits comprise at least one shorting turn of a conductor.

5. A transformer probe according to claim 1, wherein the resistive electrical component comprise a resistor connected in parallel across each primary coil within the sensing circuit.

6. A transformer probe according to claim 5, wherein each resistor has significantly lower impedance than the corresponding primary coil impedance.

7. A transformer probe according to claim 1, comprising at least two output circuits.

* * * * *